(12) United States Patent
Heisel et al.

(10) Patent No.: US 9,833,106 B2
(45) Date of Patent: Dec. 5, 2017

(54) MACHINE AND METHOD FOR PREPARING A DRINK

(71) Applicant: ETHICAL COFFEE COMPANY S.A., Fribourg (CH)

(72) Inventors: Guillaume Heisel, Evette Salbert (FR); Jean-Paul Gaillard, Cully (CH); Alain Mariller, Les Monts-de-Corsier (CH)

(73) Assignee: ETHICAL COFFEE COMPANY SA, Fribourg (CH)

( * ) Notice: Subject to any disclaimer, the term of this patent is extended or adjusted under 35 U.S.C. 154(b) by 0 days.

(21) Appl. No.: 14/783,669

(22) PCT Filed: Mar. 28, 2014

(86) PCT No.: PCT/IB2014/060254
§ 371 (c)(1),
(2) Date: Oct. 9, 2015

(87) PCT Pub. No.: WO2014/167451
PCT Pub. Date: Oct. 16, 2014

(65) Prior Publication Data
US 2016/0066741 A1    Mar. 10, 2016

(30) Foreign Application Priority Data

Apr. 11, 2013    (WO) .................. PCT/IB2013/052888

(51) Int. Cl.
*A47J 31/40* (2006.01)
*A23F 5/26* (2006.01)
*A47J 31/36* (2006.01)

(52) U.S. Cl.
CPC ............. *A47J 31/407* (2013.01); *A23F 5/262* (2013.01); *A47J 31/3633* (2013.01)

(58) Field of Classification Search
CPC ...... A47J 31/407; A47J 31/3633; A23F 5/262
See application file for complete search history.

(56) References Cited

U.S. PATENT DOCUMENTS

2012/0207893 A1    8/2012  Krueger

FOREIGN PATENT DOCUMENTS

DE    10 2009 052521    5/2011

OTHER PUBLICATIONS

English Translation for DE10200905251 published May 2011.*
(Continued)

*Primary Examiner* — Anthony Weier
(74) *Attorney, Agent, or Firm* — Nixon & Vanderhye P.C.

(57) ABSTRACT

The invention relates to a system for a drinks extraction machine using capsules introduced into a capsule cage, said system having slides allowing a capsule to be guided into the machine, held and then released in order to move into an extraction position, said cage being moved between a retracted position allowing the insertion of a capsule into the machine, and a position for the extraction of the drink wherein the capsule is held in the cage against an extraction plate, said slides being moved by actuating means in a coordinated manner with the cage, but with a delay, in such a way as to release the capsule introduced into the machine for the insertion thereof into the cage when said cage moves back into the extraction position thereof, and only to go back to the initial position once the used capsule has been extracted from the cage.

10 Claims, 22 Drawing Sheets

(56) References Cited

OTHER PUBLICATIONS

International Search Report for PCT/IB2014/060254 dated Aug. 18, 2014, four pages.
Written Opinion of the ISA (foreign-language) for PCT/IB2014/060254 dated Aug. 18, 2014, six pages.

* cited by examiner

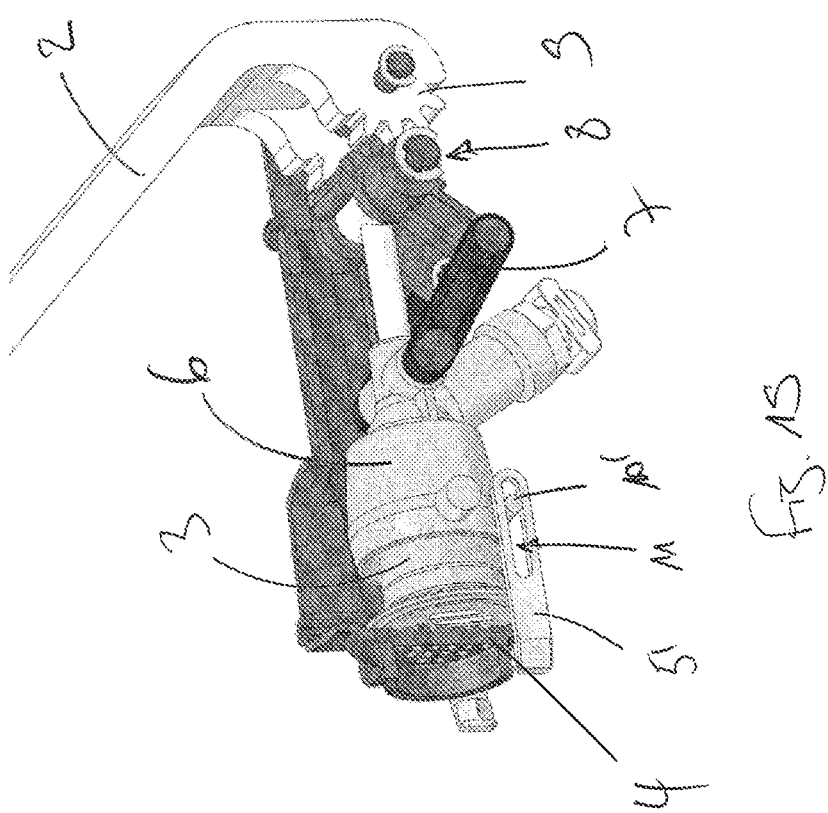

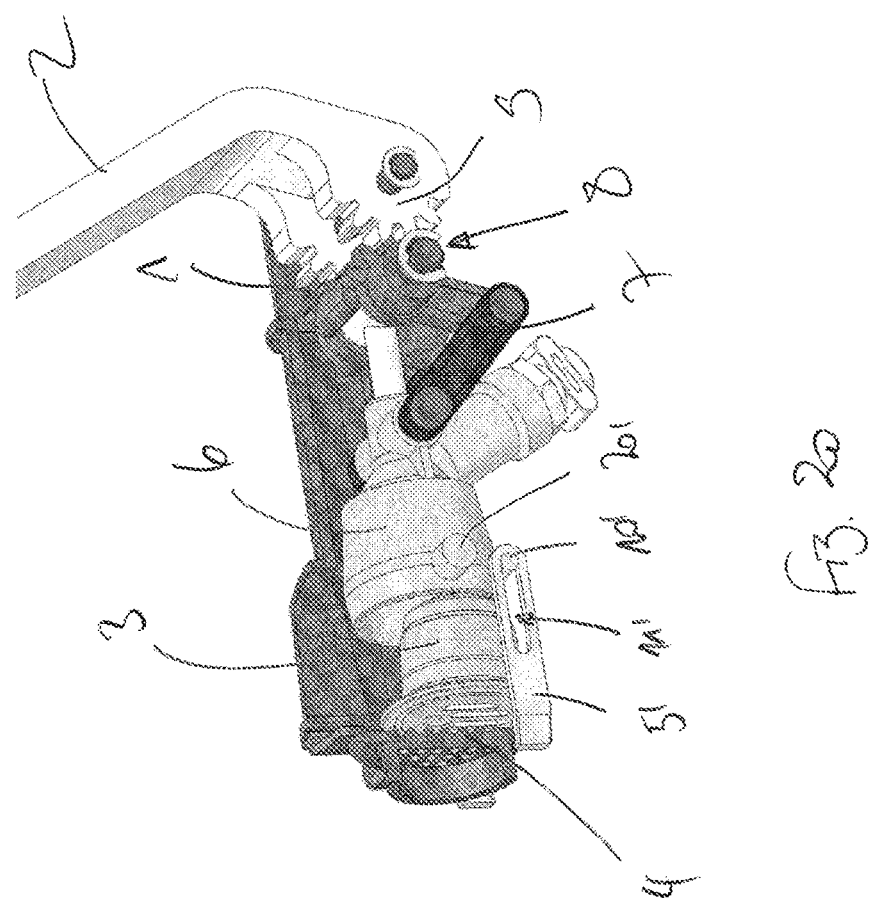

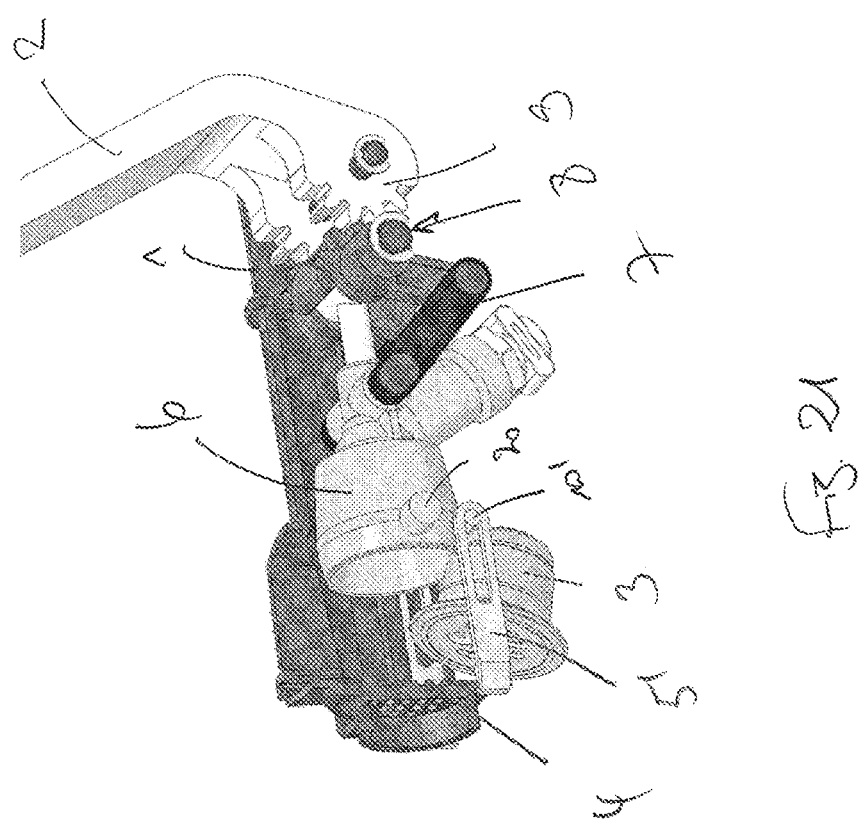

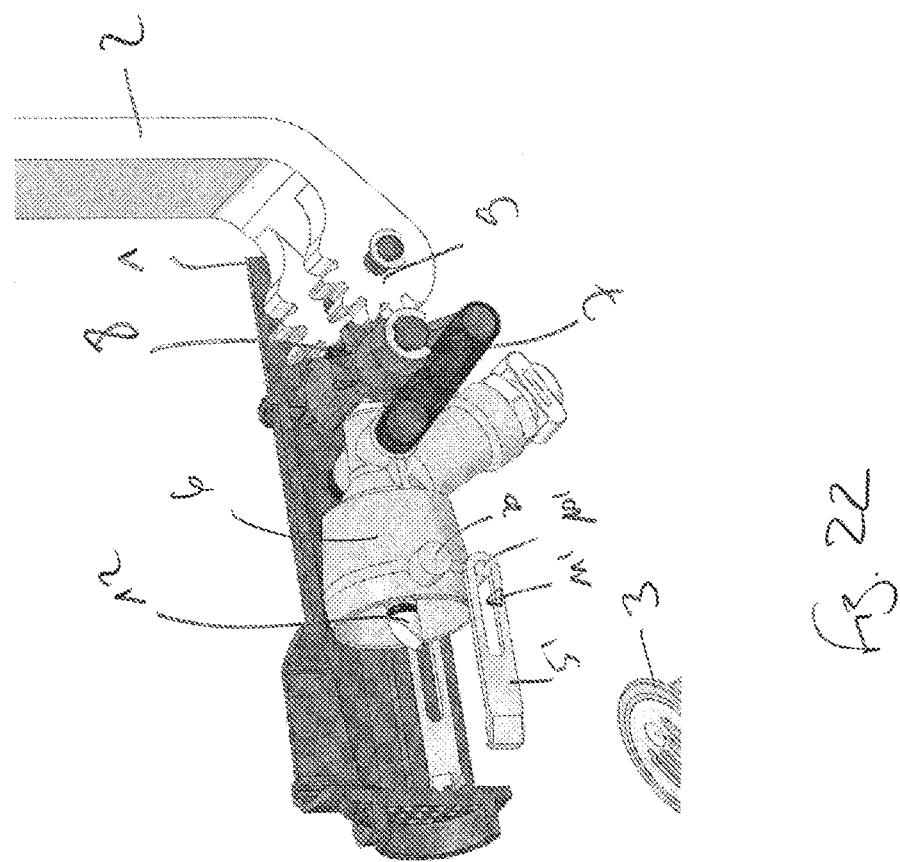

MACHINE AND METHOD FOR PREPARING A DRINK

REFERENCE TO A PRIOR APPLICATION

This application is the U.S. national phase of International Application No. PCT/IB/2014/060254 filed on Mar. 28, 2014 in the name of Ethical Coffee Company SA which designated the U.S. and claims priority to International Application No. PCT/IB2013/052888 filed Apr. 11, 2013, the entire contents of each of which are hereby incorporated by reference.

AREA OF THE INVENTION

The present invention lies in the area of preparing drinks, e.g. based on coffee, by extraction of a concentrated dose, e.g. of ground coffee, contained in a capsule. It relates more particularly to devices employing such doses, in particular to extraction machines such as coffee machines.

PRIOR ART

Capsules and machines operating according to the aforementioned principle have existed for decades.

U.S. Pat. No. 2,899,886, U.S. Pat. No. 2,968,560, U.S. Pat. No. 3,403,617 and U.S. Pat. No. 3,607,297 describe devices where the capsule is initially perforated at several points, then permeated by pressurised water.

The capsule described in patent CH 605 293 or in patent EP 0 242 556 B1 comprises a membrane in its lower part. Pressurised water is initially introduced into the upper part of the capsule, which causes swelling of the capsule, chiefly at the membrane. As from a certain pressure, the membrane tears, thus permitting the outflow of a water-coffee mixture.

Other capsules provided with a membrane are described in the following patent documents: EP 0 468 079 A, EP 0 806 373 A, EP 0 554 469 A.

By way of example, publication WO 2005/004683, the contents whereof are incorporated by reference in the present application, describes a device for the extraction of a capsule. As described in detail in this publication, one of the problems which are encountered in such devices is the positioning of the capsule in the device and the closing of the latter around the capsule to achieve the extraction.

It is in particular sought to permit positioning that is very simple for the user and reliable for the machine in order to achieve the extraction under optimum conditions.

Numerous publications of the prior art have been identified in WO 2005/004683 and reference is made to these documents for a detailed presentation of the prior art (see pages 1-3 WO 2005/004683).

This prior art WO 2005/004683 proposes several embodiments for implementing the extraction system. The principle of this prior art is as follows: it involves causing a capsule to pass from an intermediate position to an extraction position; the capsule being held in a first (so-called intermediate) position, it passes into an extraction position and, after the extraction, the capsule is released naturally under the simple effect of gravity, for example it falls into a recovery means and a new capsule can be introduced into the machine.

The fixed part comprises a guide body for the movement in translation of the mobile part towards the fixed part. The guide body can, for example, be orientated essentially horizontally to guide the mobile part in a horizontal movement. This guide body is constituted for example by at least two guide rails, preferably four guide rails. The device according to the invention permits an extraction by horizontal injection of water. The mobile part is preferably essentially cylindrical.

In the device according to WO 2005/004683, the part for the introduction and positioning of the capsule is disposed in front of and perpendicular to the guide body and comprises at least one guide means. It preferably comprises two guide means. These means can be of any kind, for example in the case of the extraction of a capsule according to patent EP 512,148, they are introduction slides permitting the flange of the capsule to be engaged.

In WO 2005/004683, a first embodiment is illustrated in particular in FIGS. 5-6, a second embodiment is illustrated in FIGS. 7-10 and a third embodiment is illustrated in FIGS. in 11-13.

In a more detailed manner, in the first embodiment, the device comprises holding means for the capsule. These holding means are configured so as to hold the capsule in the intermediate position when the capsule is introduced into the introduction and positioning part. These holding means keep the capsule along an axis that is offset or inclined with respect to the axis of the capsule in the extraction position in the housing, the extraction position corresponding to the position in which the mobile part is closed against the fixed part thereby enclosing the capsule.

According to WO 2005/004683, there are two solutions for passing from the intermediate position to the extraction position.

A first solution consists in keeping the capsule in the intermediate position in an offset manner relative to the axis of the capsule in the extraction position, for example in such a way that the mobile part, with its movement, acts on the capsule to lower it and push it along the axis of said mobile part into its extraction position. The capsule can be offset along its realignment axis (or extraction axis), for example parallel to the latter, or can be inclined with respect to its realignment axis by a certain angle, preferably an small angle less than 30 degrees. Such a solution makes it possible to avoid any mechanical complexity and to use a minimum of mobile parts. The capsule can in fact simply be held in the intermediate position by static holding means and it is the mobile part that is responsible for displacing the capsule during its displacement towards the fixed part and then positioning it in the extraction position, thereby bringing the axis of the capsule into its extraction position.

In a first preferred embodiment, the mobile part is thus configured to force the passage of the capsule beyond the holding means during the passage of the capsule from its intermediate position to its extraction position. Thus, when the mobile part moves the capsule, the latter being positioned along an offset or inclined axis, the capsule is forcibly restored into the displacement axis of the mobile part corresponding to the capsule axis in the extraction position, which forces the capsule to pass beyond the holding means. Once the capsule has passed the holding means, it is put into the extraction position by at least one of the parts closing against the other and applying the capsule against the extraction part. Once the two parts have been opened again, the capsule is no longer held by the holding means and it can thus be released.

A second possibility is that the mobile part simply pushes the capsule in its displacement axis into its extraction position.

In order to implement this second possibility, the device of WO 2005/004683 proposes holding means configured to hold the capsule in the intermediate position along an axis essentially coaxial with the axis of the housing, but the mobile part acts on the opening of the holding means to actively spread them apart and permit the passage of the capsule from its intermediate position into its extraction position.

In this embodiment, the guide means are pivoting and form or comprise holding means arranged for locking the capsule in its intermediate position when the mobile part is in the open position and for releasing the capsule when the mobile part is in the closed position. These guide means are driven into the locking position and the release position by an actuating lever, rotatably mounted and disposed outside the mobile part: this lever, by displacement of the mobile part, puts the guide means into the locking or release position.

In a final embodiment of the device according to the invention described in WO 2005/004683, the latter comprises, in front of the guide body, a retractable stop disposed beneath the mobile part. This retractable stop is also operated by the displacement of the mobile part: it makes it possible to keep the capsule in position when the mobile part is in the open position.

As will be understood, WO 2005/004683 proposes several different solutions to permit the temporary retention of the capsule in an intermediate position, its displacement into an extraction position and its release after the extraction, these solutions all having their complexity, a potential source of problems and malfunctions.

Application WO 2012/143832 A1, the contents of whereof are incorporated by reference in their entirety in the present application, describes another device for the extraction of a capsule which constitutes an improvement with respect to the systems described in WO 2005/004683.

Other publications, also incorporated in their entirety by reference in the present application are: WO 2008/04116, EP 2 105 074, WO 2006/005736.

GENERAL EXPLANATION OF THE INVENTION

One of the objectives of the present invention is aimed at improving the general functioning of the machine.

More precisely, an aim of the invention is to improve the known systems, in particular the devices described in the publications identified above, by proposing means which are simple, reliable and easy to implement.

As in the aforementioned prior art, the present invention relates to any type of capsules, and in particular to capsules having an edge, such as a flange, which cooperates with the guide means of the machine, said capsules containing any type of product as described in WO 2005/004683 or WO 2012/143832. The present invention can be used in conventional extraction machines, typically those described in this same prior art, and the description and the principles of WO 2005/004683 or WO 2012/143832 correspondingly apply here.

An idea of the present invention is to propose guide means such as capsule support slides which are connected for example to the capsule cage, but with a delay such that their displacement follows that of the cage, but with a time lag, which makes it possible to obtain beneficial effects for the capsule.

The various embodiments of the invention are defined in the appended claims.

According to a first embodiment of the invention, the system comprises slides permitting the guidance of a capsule into the machine, the holding of the capsule and the release of the capsule into an extraction position, said cage being displaced between a retracted position permitting the introduction of a capsule into the machine and a position for the extraction of the drink, wherein the capsule is held in the cage against an extraction plate. The slides are displaced by retarded actuating means in a coordinated manner with the cage, but with a delay, in such a way as, on the one hand, to release the capsule introduced into the machine for the insertion thereof into the cage when the latter is displaced into its extraction position and, on the other hand, only to return into the initial position once the used capsule has been extracted from the cage.

According to an embodiment, the retarded actuating means comprise at least one pin and one slot.

The pin or pins may be located on the cage and the corresponding slot or slots may be located on the slides.

The pin or pins may be located on the slides and the corresponding slot or slots may be located on the cage.

According to an embodiment, the cage may be actuated by a lever and transmission means.

According to an embodiment, the transmission means may comprise at least gears and a rod.

According to an embodiment, the system may comprise a capsule ejector which penetrates into the cage during the movement of the latter to push the capsule out of the cage.

According to an embodiment, the invention relates to an extraction machine for making a drink, for example coffee, comprising at least one system such as defined in the present application.

In an embodiment, the machine is combined with at least one capsule containing a product for making a drink. The product can be coffee or another product (tea etc.).

According to an embodiment, the invention also relates to a method of extracting a drink, such as coffee, employing a system for an extraction machine, said system using capsules introduced into a capsule cage, said system comprising slides guiding the entry of a capsule into the machine, the holding of the capsule and the release of the capsule into an extraction position, in which method said cage is displaced between a retracted position permitting the introduction of a capsule into the machine and a position for the extraction of the drink, wherein the capsule is held in the cage against an extraction plate, said slides being displaced in a coordinated manner with the cage, but with a delay, in such a way as, on the one hand, to release the capsule introduced into the machine for the insertion thereof into the cage when the latter is displaced into its extraction position and, on the other hand, only to return into the initial position once the used capsule has been extracted from the cage.

According to an embodiment, the invention relates to a method using a machine as described in the present application.

According to another embodiment, the invention relates to the use of a system or a machine as described in the present application.

DETAILED DESCRIPTION OF THE INVENTION

The present invention will be better understood by the description of embodiments thereof and figures which show:

FIG. 19 illustrates a cross-sectional side view of a second embodiment of the invention in a fifth position;

FIG. 20 illustrates a cross-sectional side view of a second embodiment of the invention in a sixth position;

FIG. 21 illustrates a cross-sectional side view of a second embodiment of the invention in a seventh position;

FIG. 22 illustrates a cross-sectional side view of a second embodiment of the invention in an eighth position;

In the following description, similar and/or identical elements in the different figures are identified by the same numerical references.

Figure 1:
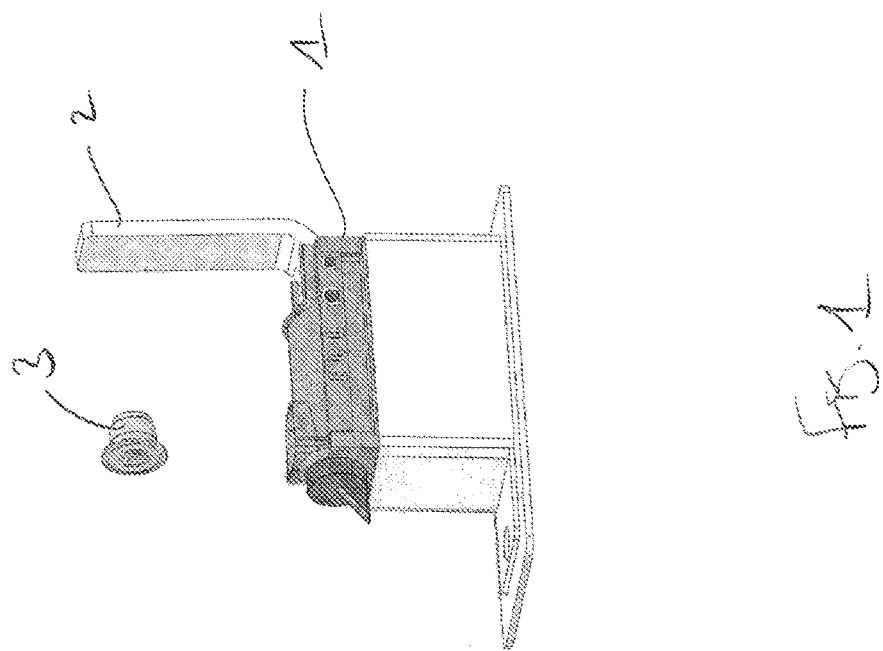
FIG. 1 illustrates a general perspective view of a part of an extraction machine according to the invention with a capsule.

FIG. 1 illustrates a general perspective view of a part of machine 1 used for the preparation of a drink, for example coffee, contained in a capsule 3. As is known in the prior art (see for example the publications cited above in the present application), capsule 3 is introduced into the machine and held in a capsule cage by operating a lever 2.

Figure 2:
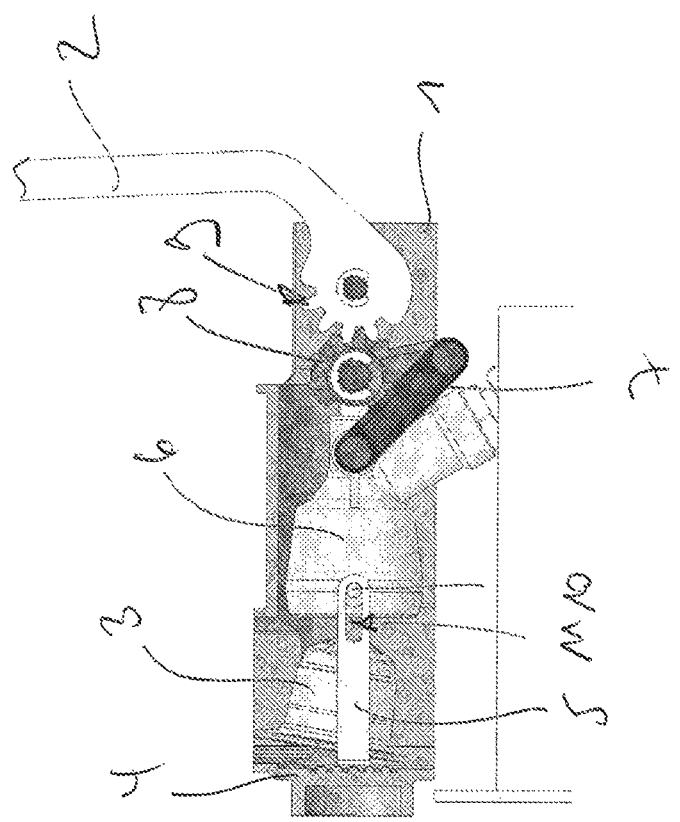
FIG. 2 illustrates a cross-sectional side view of the invention in a first position.

FIG. 2 illustrates a cross-sectional side view of the drink extraction system, once capsule 3 has been introduced into the machine, for example guided by a slot, according to a method known from the prior art, see in particular the explanations contained in WO 2012/143832.

Capsule 3 is held opposite extraction plate 4 by mobile slides 5 according to principles known from the prior art, the guidance and the retention of capsule 3 being carried out at its flange.

Also present in the machine is a capsule cage 6 which is displaced axially, moved by a set of rods 7 and gears 8, 9, gear 9 being connected to lever 2.

In the position illustrated in FIG. 2, capsule 3 has been introduced into machine 1, lever 2 is in a raised position, i.e. cage 6 is in a position removed from extraction plate 4 so as to permit good positioning of the capsule 3 as illustrated.

Figure 3:
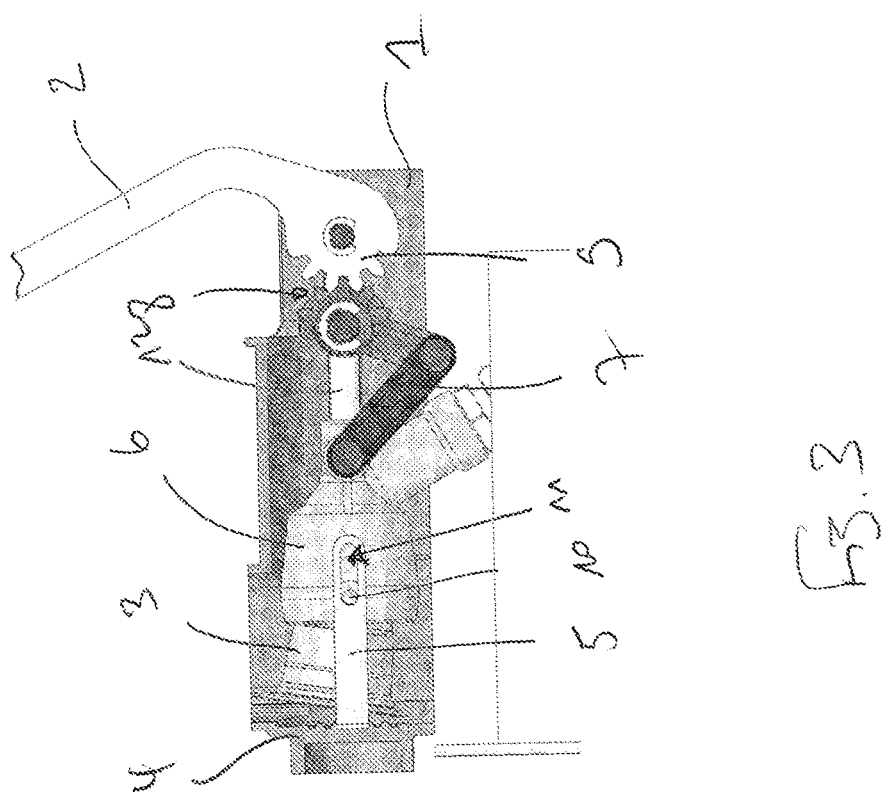
FIG. 3 illustrates a cross-sectional side view of the invention in a second position.

In FIG. 3, lever 2 (operated for example manually by a user) has started a rotational movement towards the left thereby being lowered. As a result of this rotation, gear system 8, 9 and rod 7 are acted upon and rod 7 pushes capsule cage 6 axially in the direction of plate 4 (towards the left of FIG. 3). Cage 6 comprises a pin 10 on each side (only one side is illustrated here) which is displaced in slot 11 of slide 5. In FIG. 2, the pin is located on the right-hand side of slot 11 (proximal side), whilst in FIG. 3 pin 10 is located on the left-hand side of slot 11 (distal side).

The arrival of pin 10 in its distal position in slot 11 results in an axial displacement (towards the left of the figure) of slide 5, which releases the flange of capsule 3. At the same time, the capsule is "trapped" at its highest point in cage 6 and held in position against plate 4 and cage 6 as illustrated in FIG. 3.

Figure 4:
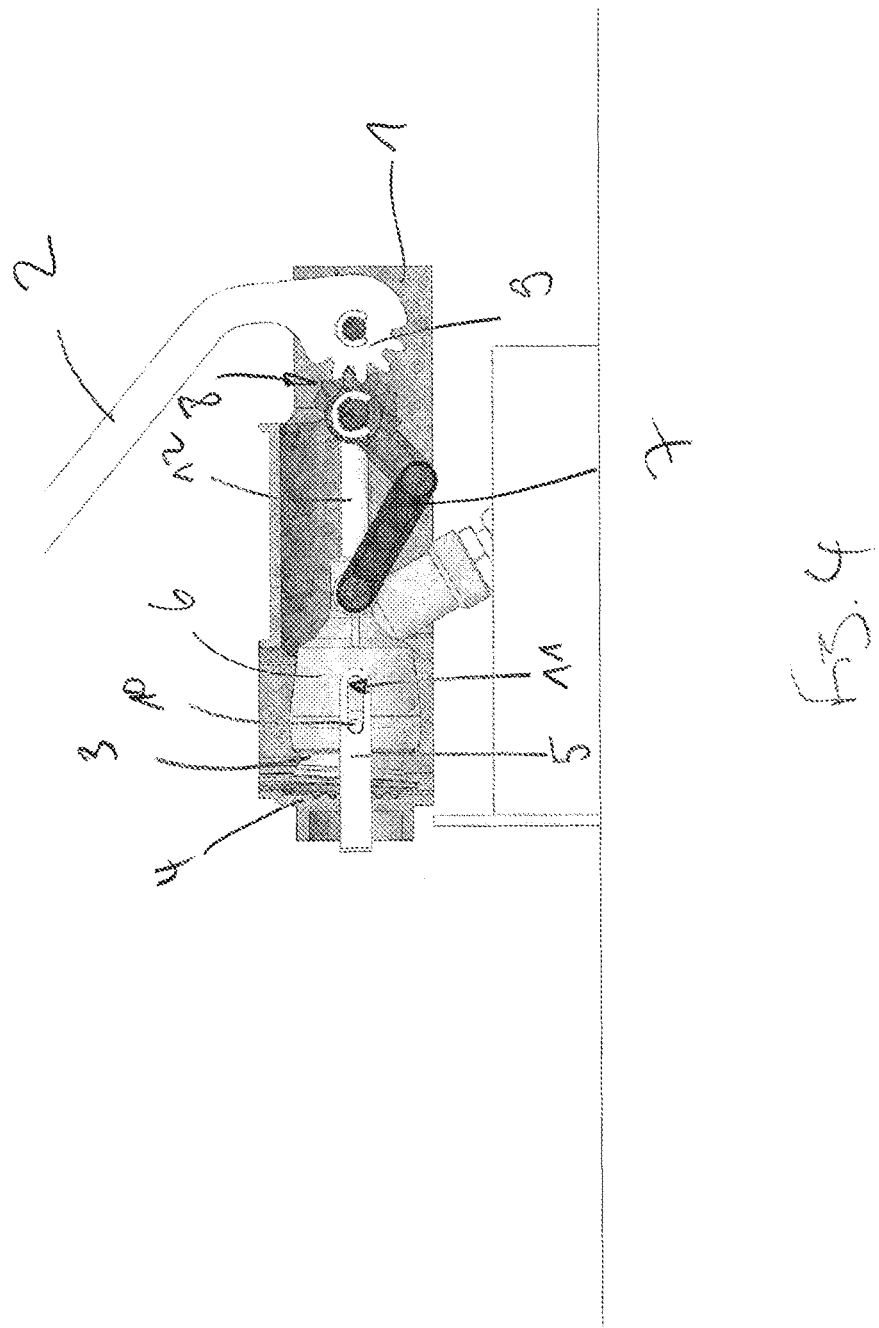
FIG. 4 illustrates a cross-sectional side view of the invention in a third position.

FIG. 4 illustrates another position of the system in which lever 2 has continued its rotation towards the left (its descent), the effect of which is to continue the displacement of cage 6 towards plate 4 (towards the left) and slides 5.

Figure 5:
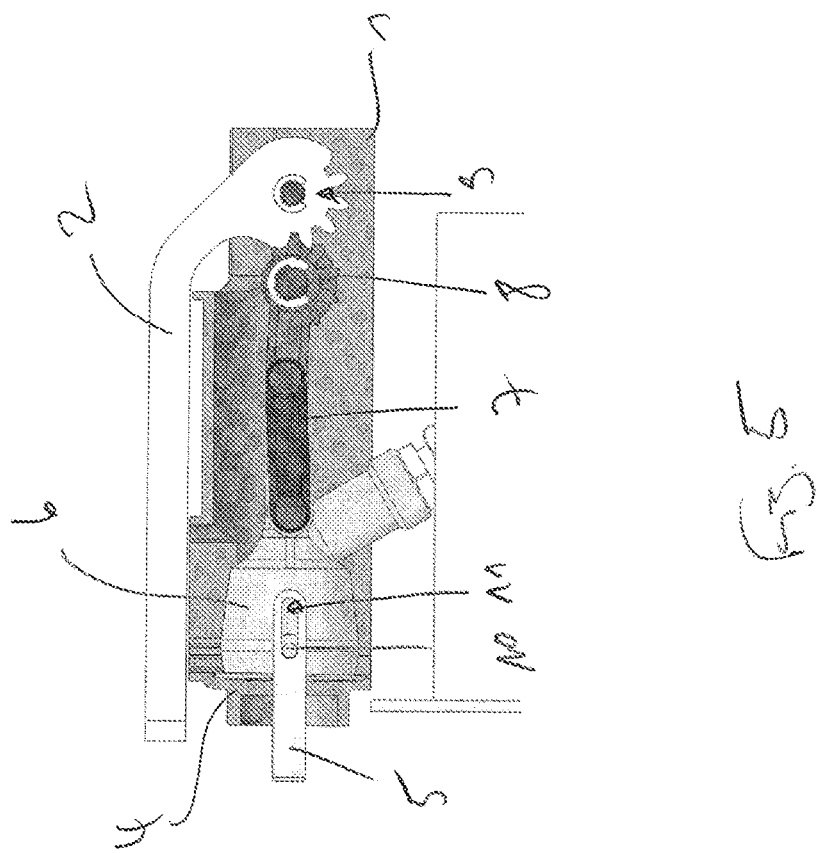
FIG. 5 illustrates a cross-sectional side view of the invention in a fourth position.

Finally, FIG. 5 illustrates the machine ready for the extraction of the drink. Lever 2 is completely lowered, capsule 3 is completely contained in cage 6 and slides 5 have been pushed to the left of machine 1. The drink can be extracted by the injection of pressurised liquid (for example water), which exits at plate 4 once it has passed through the capsule and the product contained in the capsule, in accordance with extraction methods known for example from the prior publications mentioned above.

Once the extraction of the drink is completed, it is a matter of opening the mechanism to release the used capsule and to prepare for the reception of a new capsule.

Figure 6:
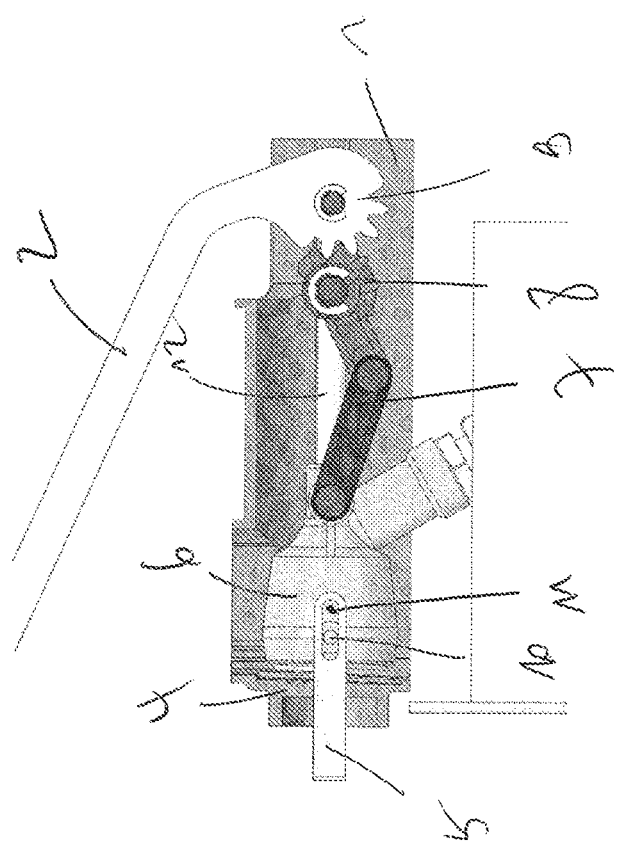
FIG. 6 illustrates a cross-sectional side view of the invention in a fifth position.

FIG. 6 illustrates the start of the opening movement of the mechanism. For this purpose, lever 2 is moved upwards. Through gears 8, 9 and rod 7, this movement of lever 2 has the effect of retracting cage 6 towards the right of FIG. 6. The effect of this movement of the cage is that pins 10 are displaced towards the proximal side of slots 11, i.e. towards the right, but without causing movement of slides 5 thanks to slot 11 in which pin 10 can be displaced. The slides thus have a delayed movement compared to that of cage 6. This delay is taken advantage of in the present invention to allow easy and reliable extraction of the capsule, as is now explained and illustrated below.

Figure 7:
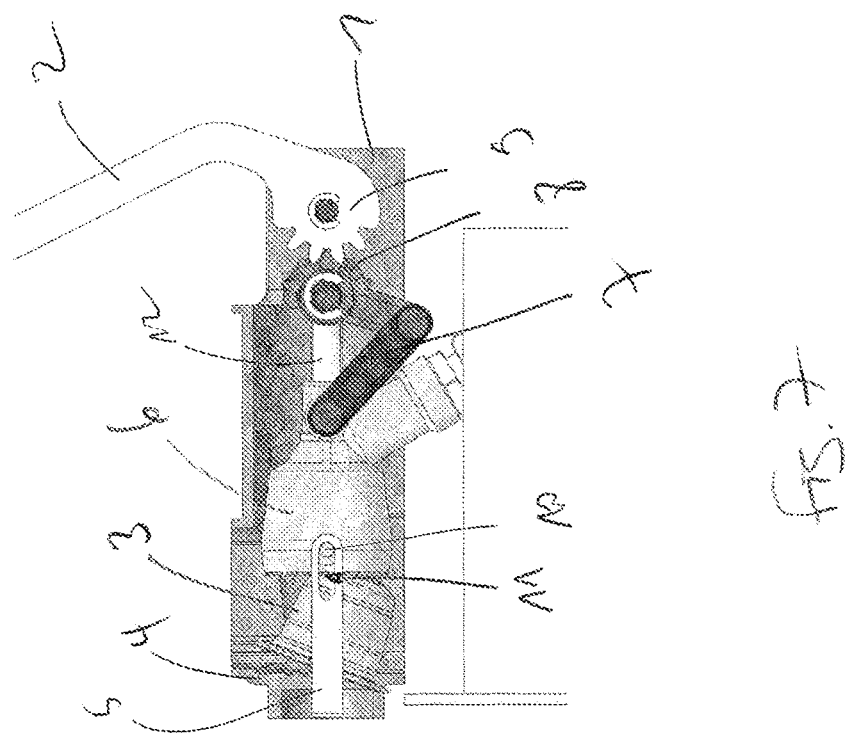
FIG. 7 illustrates a cross-sectional side view of the invention in a sixth position.
Figure 8:
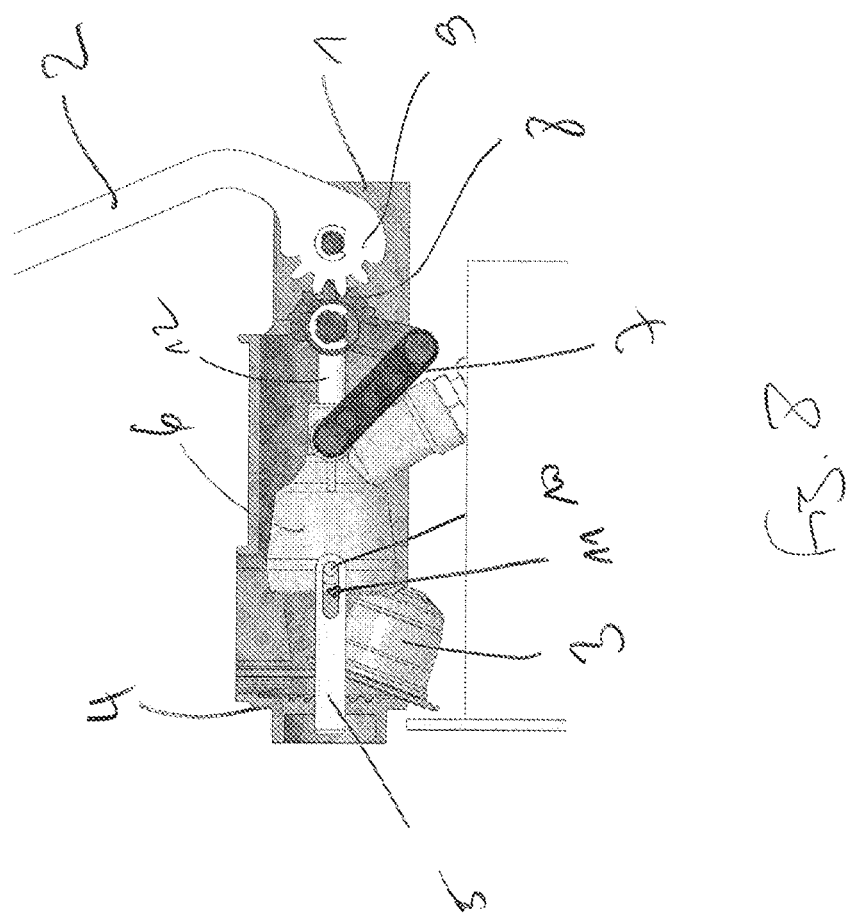
FIG. 8 illustrates a cross-sectional side view of the invention in a seventh position.

In FIG. 7, the opening movement of the machine is continued and lever 2 is moved upwards. By means of rod 7 and gears 8, 9, cage 6 continues its retracting movement towards the right of the figure and capsule 3 is released from its hold. The movement of cage 3 and pins 10 brings them to the proximal end of slot 11, such that it is only at this time (as illustrated in FIG. 7, when pins 10 have passed through the length of slots 11) that the slides start their return movement into position (towards the right-hand side of the figure). Thanks to this delay in the actuation of slide 5 brought about by the displacement of pins 10 in slots 11, capsule 3, which is extracted from cage 6, is completely released without being held by slides 5, and it can fall out of the machine once it is sufficiently released from cage 6. This situation is illustrated in FIG. 8 where it can be seen that capsule 3 has started to fall downwards.

Figure 9:
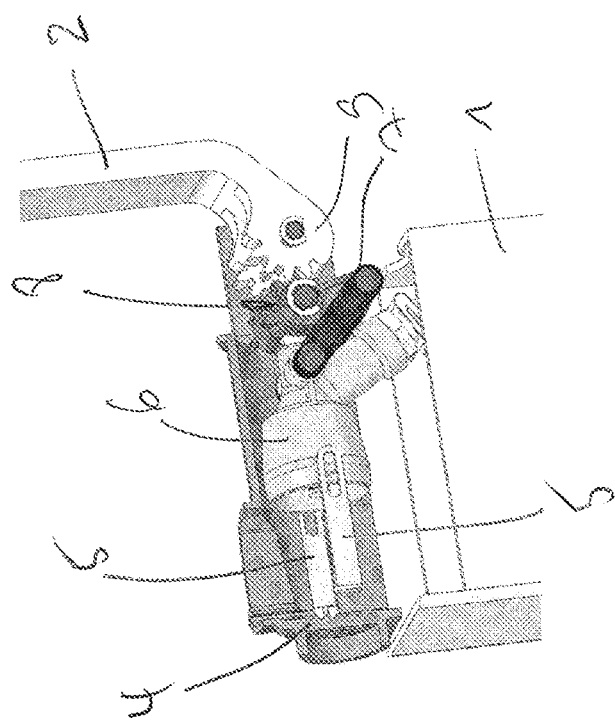
FIG. 9 illustrates a cross-sectional side view of the invention in an eighth position.

FIG. 9 is a perspective and cross-sectional view of machine 1, in which the mechanism has returned to an initial position (for example as illustrated in FIG. 2), in which it can receive a new capsule 3. The two slides 5 can be seen here, which are located on each side of cage 6 with their slot 11, the cage having a pin 10 on each side also in accordance with the principles of the present invention. Slides 5 have been brought into the initial position by the movement of cage 6 and pins 10 in the slots.

Another advantage of the delay in the movement of slides 5 brought about by the design of slots 11 and pins 10, apart from the fact that it allows a release of the used capsule, is that when a capsule 3 is present, slides 5 are not displaced immediately when cage 6 is advanced in the direction of plate 4 (situation illustrated in FIGS. 2 and 3) with a view to the extraction, which ensures a good hold of capsule 3 in the initial phase.

Figure 10:
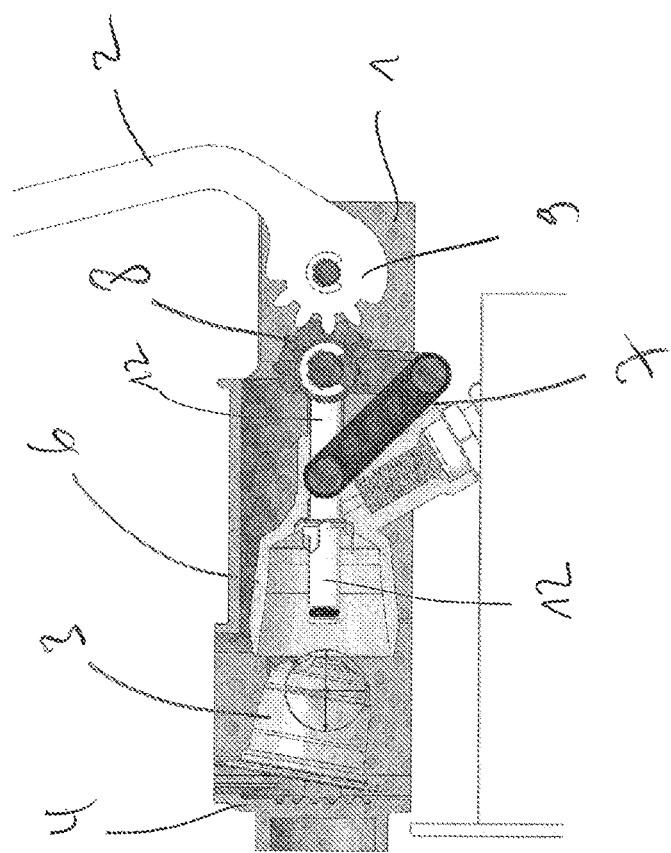
FIG. 10 illustrates another cross-sectional side view of the invention in a position between the positions of FIGS. 2 and 3.

FIG. 10 illustrates another cross-sectional side view of the mechanism of the invention. This view permits the representation of an example of the means facilitating the ejection of a used capsule 3 out of cage 6. More precisely, the position of the mechanism illustrated in FIG. 10 corresponds to that of FIG. 2 when a new capsule 3 is introduced into machine 1.

Figure 11:
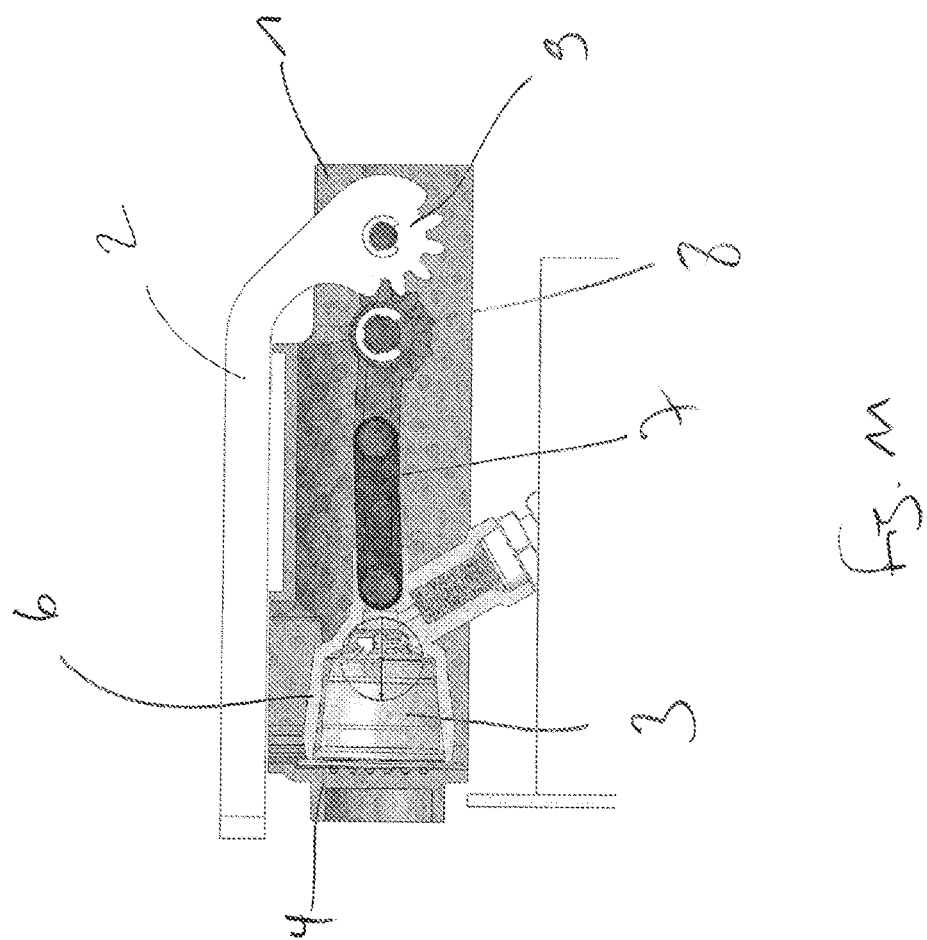
FIG. 11 illustrates a cross-sectional side view of the position of FIG. 5.

FIG. 11 corresponds to the position of the mechanism illustrated in FIG. 5 when the machine is ready for the extraction of the drink.

Figure 12:
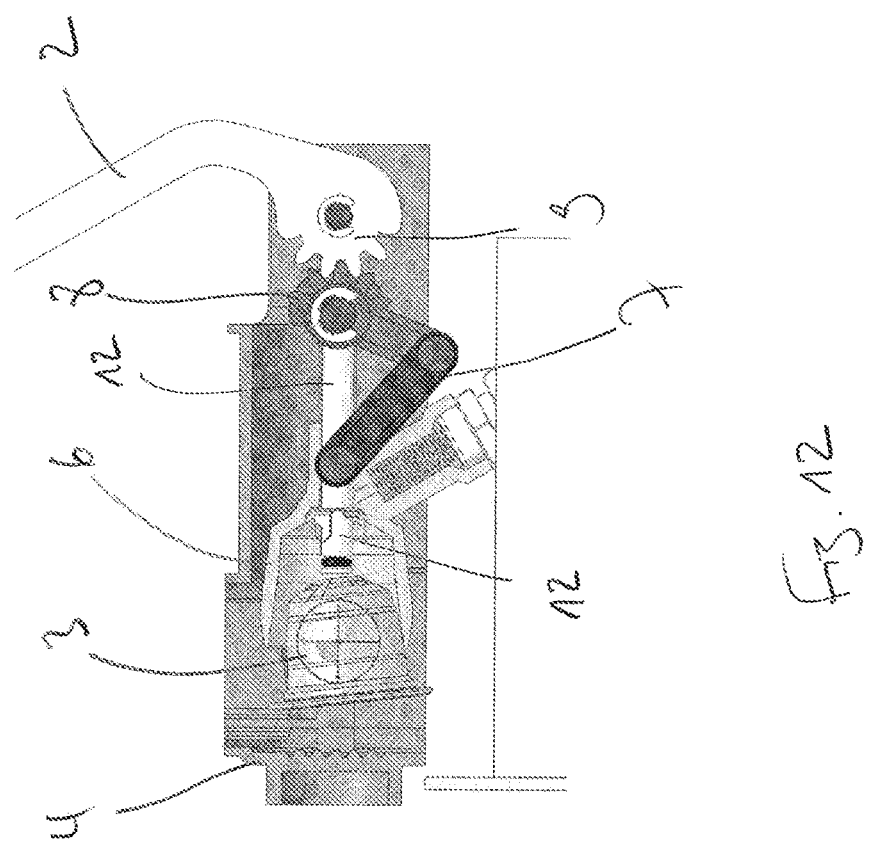
FIG. 12 illustrates another cross-sectional side view of the invention in a position between the positions of FIGS. 6 and 7.

FIG. 12 corresponds to the position of the mechanism of FIG. 7, when the mechanism starts to be opened to release a used capsule 3. Cage 6 starts its return movement (towards the right of the figure) and capsule 3 is pushed out of cage 6 by means of an ejector 12, which is fixed in machine 1 and along which cage 6 is displaced.

Figure 13:
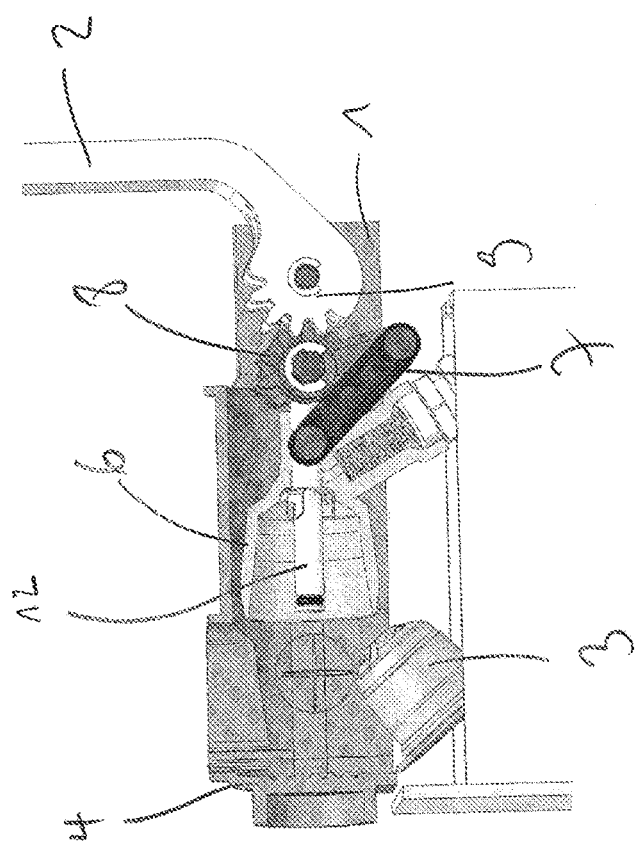
FIG. 13 illustrates another cross-sectional side view of the invention in a position between the positions of FIGS. 8 and 9.

FIG. 13 illustrates the stage during which capsule 3 falls out of cage 6 after opening of the mechanism. This stage corresponds to that illustrated in FIG. 8, but a little later when capsule 3 has started its fall into a capsule recovery unit from the machine.

FIGS. 14 to 22 illustrate a second embodiment of the extraction machine according to the invention.

Figure 14:
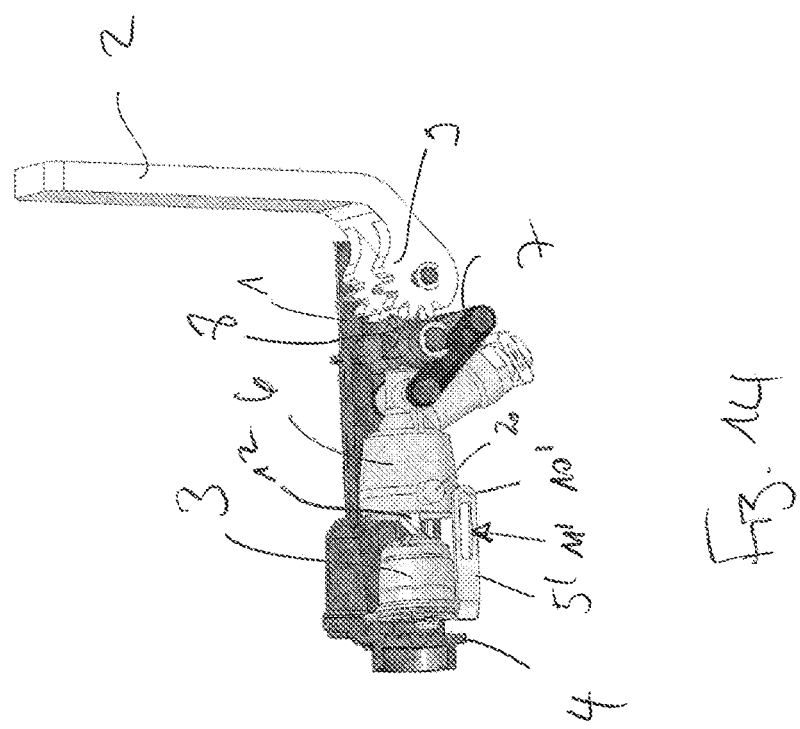
FIG. 14 illustrates a cross-sectional side view of a second embodiment of the invention in a first position.

In FIG. 14, which roughly corresponds to the position of FIG. 2 of the first embodiment, handle 2 is in a raised position (machine open) and a capsule 3 has been introduced into the machine and is held by slides 5' and ejector 12. In this embodiment, this makes it possible to have a capsule 3 whose axis is aligned with that of cage 6, despite the fact that capsule 3, which is held by the flange, will have a tendency to tip due to its shape and the position of its centre of gravity with respect to the flange. Slide 5' comprises a slot 11' which slides on a pin or spindle 10' of cage 6. An axle 20 is provided for the longitudinal guidance of cage 6. As can be seen by comparison with FIGS. 2 and 14, slide 5' is offset towards the bottom of cage 6 in the second embodiment.

Figure 15:
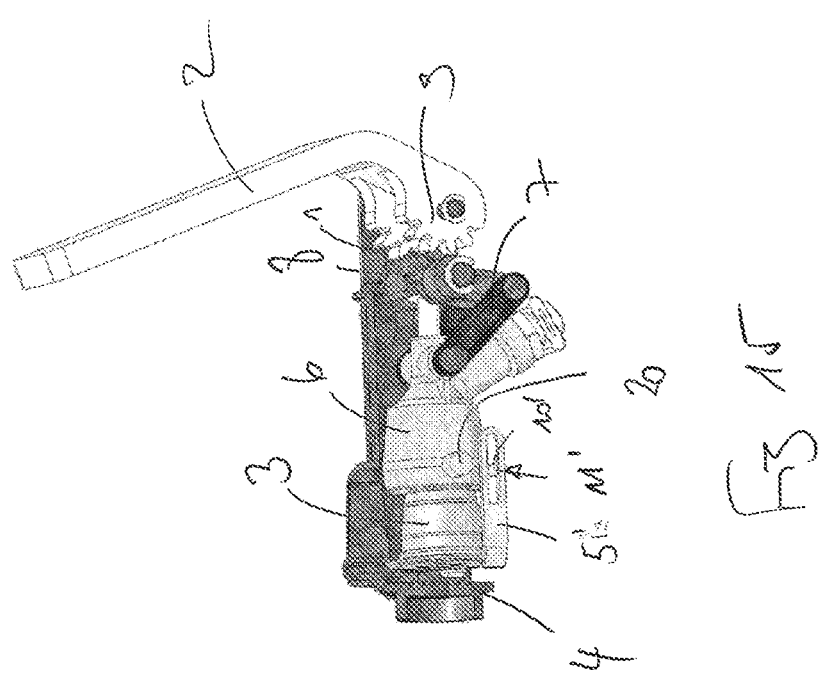
FIG. 15 illustrates a cross-sectional side view of a second embodiment of the invention in a second position.

FIG. 15 illustrates a position in which a lowering of handle 2 has been started and, by the set of gears 9, 8 and rod 7, cage 6 starts to advance towards the left of the figure, without moving slides 5' on account of the presence of retarding slot 11'. Since ejector 12 also has a fixed position with respect to cage 6, capsule 3 is held in a stable position while cage 6 is displaced.

Figure 16:
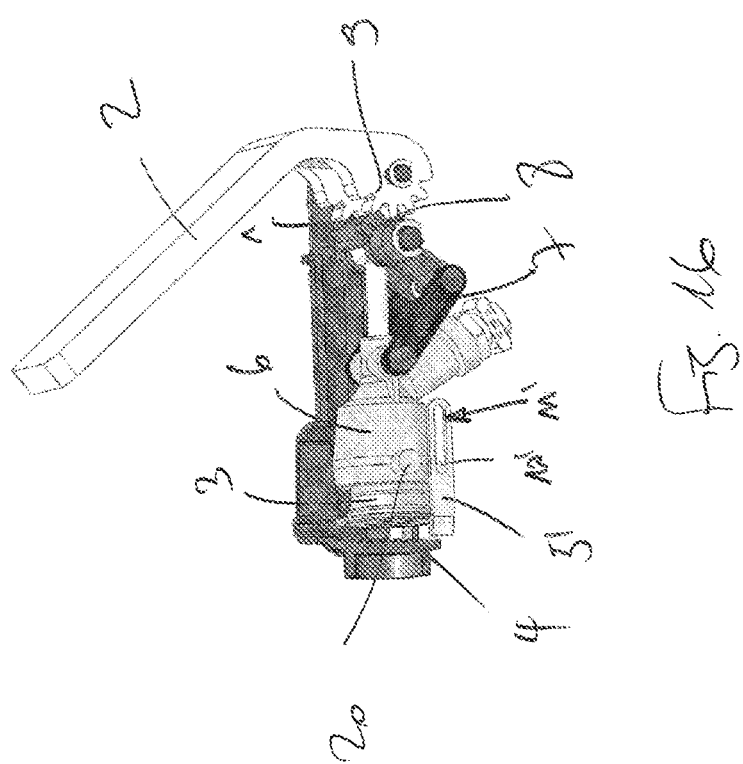
FIG. 16 illustrates a cross-sectional side view of a second embodiment of the invention in a third position.

As lever 2 continues to be lowered, the position of FIG. 16 is then arrived at where, since spindles 10' have reached the end of slots 11', slides 5' are also displaced towards the left of the figure, together with cage 6. In the position illustrated in FIG. 16, the front ends of the slides are disengaged from the flange of capsule 3 and the latter is now held by extraction plate 4 and cage 6.

Figure 17:
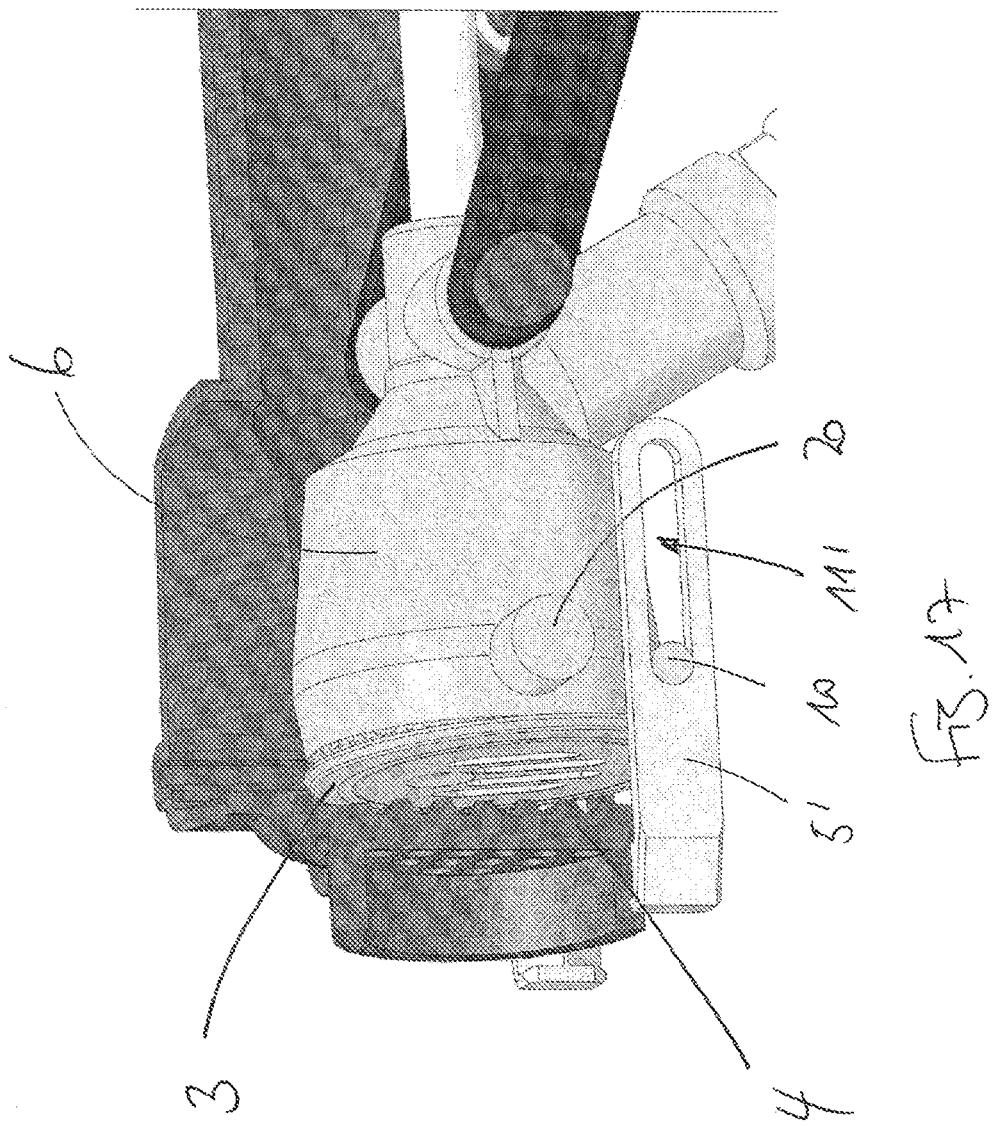
FIG. 17 illustrates a cross-sectional side view of a second embodiment of the invention in a fourth position.

FIG. 17 illustrates the near-extraction position when capsule 3 is almost disposed against plate 4 and slides 5' have been completely advanced under the effect of the advancement of cage 6 towards the left of the figure.

Figure 18:
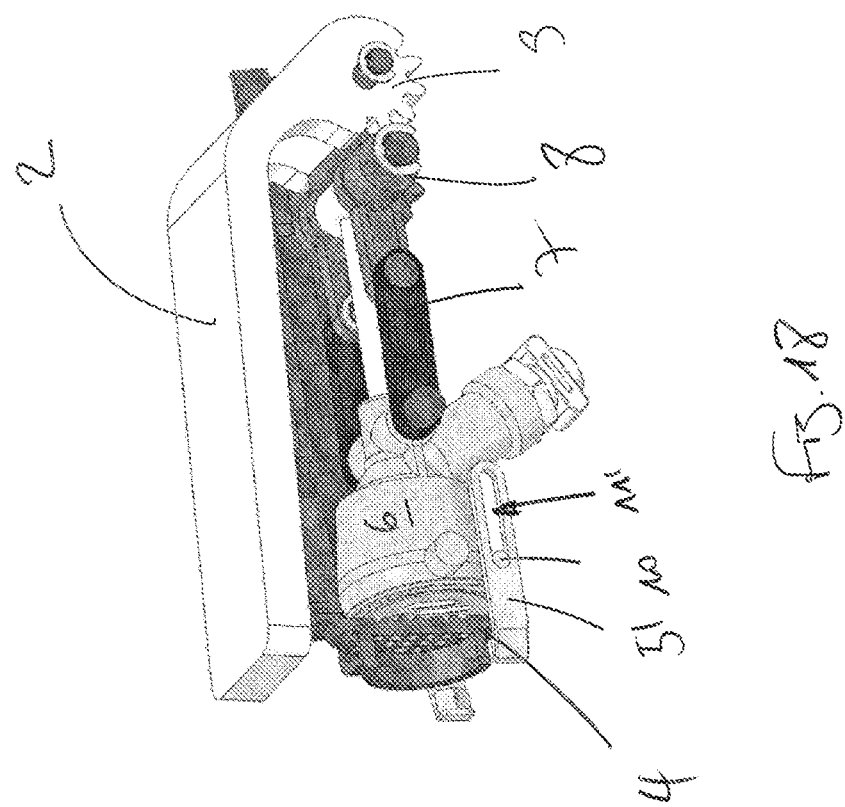
FIG. 18 illustrates a cross-sectional side view of a second embodiment of the invention in a drink extraction position.

FIG. 18 illustrates the machine in the extraction position with cage 6 and plate 4 enclosing capsule 3.

FIG. 19 illustrates the start of the retraction procedure of cage 6 after the extraction of the drink. The handle is raised and moves cage 6 backwards (towards the right-hand side of the figure). Despite the start of the retraction movement of cage 6, slides 5' have not moved and it is spindle 10' that is displaced in slot 11'. Capsule 3 is either already released from cage 6 or it is carried by the cage until it comes into contact with ejector 12 which pushes it out of cage 6.

FIG. 20 illustrates the rest of the retraction procedure of cage 6 for the evacuation of used capsule 3. Handle 2 has a higher position than in the preceding figure and cage 6 has gone farther back (towards the right of the figure), now driving slides 5' inasmuch as spindles 10' have reached the proximal end (close to handle 2). The effect of any movement of cage 6 to the right is a corresponding movement of slides 5' to the right.

In the representation of FIG. 21, cage 6 has gone back sufficiently for capsule 3 to be able to fall out of cage 6, a fall which is illustrated by the position of the capsule shifted downwards compared to the preceding figure.

Slides 5' have not yet returned to their initial position (as illustrated in the FIG. 14), such that capsule 3 can fall freely.

This falling movement of the capsule is also illustrated in a more emphasised way in FIG. 22 where the handle is in a vertical, or even near-vertical, position.

In this position of the system, cage 6 is in its most retracted position and the ejector can be seen at the centre of the latter. The system can now receive a new capsule 3: the position is that of FIG. 14, but without a capsule having been introduced into the device. Once a new capsule 3 has been received, the extraction cycle begins again starting from FIG. 14.

The invention is not of course limited to the methods of extraction described as illustrative and non-limiting and variations are possible within the scope of the claimed protection. It is also possible to freely combine the described embodiments depending on the circumstances.

In particular, recourse can be taken to means equivalent to those described.

The slides can be adapted in any way to the use according to the invention. For example, they can be made of plastic, synthetic material etc.

It is possible to envisage other forms of technical means permitting the delay in movement of slides 5 instead of pins 10 and slots 11. It is possible for example to use a cam system or other system. The slides can be actuated for example by rod 7 or lever 2 rather than by cage 6 and its pins 10. Slots 11 can have any suitable size for achieving the sought result.

The invention claimed is:

1. A system for a machine extraction of a drink from a capsule containing an extractable product for making the drink, wherein the system comprises:
    an extraction plate,
    slides for (i) permitting guided entry of the capsule into the machine, (ii) holding of the capsule within the machine to allow extraction of the drink from the extractable product, and (iii) releasing an extracted spent capsule into a spent capsule location,
    a capsule cage for receiving the capsule, the capsule cage being reciprocally axially displaceable relative to the extraction plate between a retracted position whereby the capsule cage is axially spaced from the extraction plate permitting introduction of the capsule into the machine, and an extraction position whereby the capsule is held in the capsule cage against the extraction plate for the extraction of the drink from the extractable product within the capsule, and a retarded actuation assembly operatively interconnecting the slides and the capsule cage, wherein the retarded actuation assembly causes delayed axial displacement of the slides between the distal and proximal positions thereof relative to the capsule cage in a coordinated manner in response to axial movement of the capsule cage between the extraction and retracted positions thereof in such a way as to enable a relative axial movement to occur between the capsule cage and the slides so as to (1) release the spent capsule from the capsule cage when the capsule cage is displaced away from the extraction position thereof with the slides being in the distal position thereof relative to the capsule cage and (2) only return into the proximal position thereof relative to the capsule cage once the spent capsule has been extracted from the capsule cage to be directed into the spent capsule location.

2. The system according to claim 1, wherein the retarded actuating assembly comprises at least one slot and at least one pin configured to move within the at least one slot between distal and proximal locations therewithin, wherein the slides are moved axially by the at least one pin when reaching the distal or proximal locations within the slot so as to establish the distal and proximal positions of the slides relative to the capsule cage, respectively.

3. The system according to claim 2, wherein the at least one pin is located on the capsule cage and the at least one slot is located on the slides.

4. The system according to claim 2, wherein the at least one pin is are located on the slides and the at least one slot is located on the capsule cage.

5. The system according to claim 1, wherein the system further comprises a lever and a transmission assembly for transmitting movement of the lever to the capsule cage.

6. The system according claim 5, wherein the transmission assembly comprises at least gears and a rod.

7. The system according to claim 1, wherein the system further comprises a capsule ejector which penetrates into the capsule cage during movement of the capsule cage so as to push the capsule out of the capsule cage.

8. An extraction machine for a drink, comprising at least one system for machine extraction of a drink from a capsule wherein the at least one system is the system as defined in claim 1.

9. The machine according to claim 8, in combination with at least one capsule containing a product for making a drink.

10. A method of extracting a drink which comprises:
(a) introducing a capsule containing a product for making a drink into the machine according to claim 8 so that the capsule is positioned in the capsule cage thereof, and
(b) operating the machine to extract the drink from the capsule.

* * * * *